US008311894B2

(12) United States Patent
Nykamp

(10) Patent No.: US 8,311,894 B2
(45) Date of Patent: Nov. 13, 2012

(54) METHOD AND APPARATUS FOR INTERACTIVE AND SYNCHRONOUS DISPLAY SESSION

(75) Inventor: Paul Nykamp, Toronto (CA)

(73) Assignee: Reliable Tack Acquisitions LLC, Wilmington, DE (US)

( * ) Notice: Subject to any disclaimer, the term of this patent is extended or adjusted under 35 U.S.C. 154(b) by 181 days.

(21) Appl. No.: 12/706,486

(22) Filed: Feb. 16, 2010

(65) Prior Publication Data

US 2010/0205533 A1 Aug. 12, 2010

Related U.S. Application Data

(63) Continuation of application No. 12/533,126, filed on Jul. 31, 2009, now Pat. No. 7,908,178, which is a continuation of application No. 11/062,920, filed on Feb. 23, 2005, now Pat. No. 7,580,867, which is a continuation-in-part of application No. 10/957,619, filed on Oct. 5, 2004, now Pat. No. 7,577,588.

(60) Provisional application No. 60/567,656, filed on May 4, 2004.

(51) Int. Cl.
*G06Q 30/00* (2006.01)
(52) U.S. Cl. ..................................... 705/26.1
(58) Field of Classification Search .................. 705/26.1
See application file for complete search history.

(56) References Cited

U.S. PATENT DOCUMENTS

| 4,949,248 A | 8/1990 | Caro |
| 5,008,853 A | 4/1991 | Bly et al. |
| 5,220,657 A | 6/1993 | Bly et al. |
| 5,235,680 A | 8/1993 | Bijnagte |
| 5,392,400 A | 2/1995 | Berkowitz et al. |

(Continued)

FOREIGN PATENT DOCUMENTS

EP 0319232 A2 6/1989

(Continued)

OTHER PUBLICATIONS

Visual Network Design Announces Rackwise, Web-Based Service Easily Configures, Visualizes and Documents Network Racks; Business Editors/High-Tech Writers; Business Wire. New York: Dec. 8, 2003. p. 1; http://proquest.umi.com/pqdweb?did=484723771&sId=1&Fmt=3&clientId=19649&RQT=309&VName=PQD.*

(Continued)

*Primary Examiner* — Mila Airapetian

(57) ABSTRACT

A system for interactively displaying and distributing information. The information may relate to consumer products, any type of article of commerce, marketing and advertising layouts, floor plans, planograms or any other type of information that is capable of being illustrated graphically. A consumer engages in an Interactive Information Session with an attendant, such a help desk attendant. During the Interactive Information Session, the attendant and consumer see synchronized displays of images or animations of the information, which may be manipulated by either one of them. The attendant and the user can communicate interactively by voice or text during at least part of the Interactive Information Session. In another embodiment, two or more users of a system according to the invention can collaboratively design a product, marketing or advertising layouts, planograms, floor plans or other graphical information in an Interactive Design Session. During the session one of the users controls the design at any time. Different users may have control at different times. The users can engage in interactive voice or text communications during at least part of the Interactive Design Session.

27 Claims, 7 Drawing Sheets

U.S. PATENT DOCUMENTS

| | | | |
|---|---|---|---|
| 5,446,842 A | 8/1995 | Schaeffer et al. | |
| 5,572,430 A | 11/1996 | Akasaka et al. | |
| 5,808,662 A | 9/1998 | Kinney et al. | |
| 5,812,130 A | 9/1998 | Van Huben et al. | |
| 5,844,553 A | 12/1998 | Hao et al. | |
| 5,844,554 A | 12/1998 | Geller et al. | |
| 5,860,074 A | 1/1999 | Rowe et al. | |
| 5,862,330 A | 1/1999 | Anupam et al. | |
| 5,870,547 A | 2/1999 | Pommier et al. | |
| 5,899,810 A | 5/1999 | Smith | |
| 5,940,082 A * | 8/1999 | Brinegar et al. | 345/442 |
| 5,944,785 A | 8/1999 | Pommier et al. | |
| 5,948,022 A | 9/1999 | Carleton et al. | |
| 5,974,446 A | 10/1999 | Sonnenreich et al. | |
| 5,978,648 A | 11/1999 | George et al. | |
| 6,025,846 A | 2/2000 | Chudley | |
| 6,067,551 A | 5/2000 | Brown et al. | |
| 6,100,897 A | 8/2000 | Mayer et al. | |
| 6,108,687 A | 8/2000 | Craig | |
| 6,151,621 A | 11/2000 | Colyer et al. | |
| 6,151,622 A | 11/2000 | Fraenkel et al. | |
| 6,167,432 A | 12/2000 | Jiang | |
| 6,173,317 B1 | 1/2001 | Chaddha et al. | |
| 6,181,689 B1 | 1/2001 | Choung et al. | |
| 6,195,091 B1 | 2/2001 | Harple et al. | |
| 6,195,098 B1 | 2/2001 | Brittain et al. | |
| 6,201,948 B1 | 3/2001 | Cook et al. | |
| 6,212,192 B1 | 4/2001 | Mirashrafi et al. | |
| 6,215,498 B1 | 4/2001 | Filo et al. | |
| 6,219,057 B1 | 4/2001 | Carey et al. | |
| 6,281,906 B1 | 8/2001 | Andersson | |
| 6,295,551 B1 | 9/2001 | Roberts et al. | |
| 6,330,685 B1 | 12/2001 | Hao et al. | |
| 6,343,313 B1 | 1/2002 | Salesky et al. | |
| 6,351,777 B1 | 2/2002 | Simonoff | |
| 6,356,933 B2 | 3/2002 | Mitchell et al. | |
| 6,363,404 B1 | 3/2002 | Dalal et al. | |
| 6,370,570 B1 | 4/2002 | Muir et al. | |
| 6,373,936 B1 | 4/2002 | Raniere et al. | |
| 6,377,257 B1 | 4/2002 | Borrel et al. | |
| 6,384,821 B1 | 5/2002 | Borrel et al. | |
| 6,414,677 B1 | 7/2002 | Robertson et al. | |
| 6,446,113 B1 | 9/2002 | Ozzie et al. | |
| 6,463,460 B1 | 10/2002 | Simonoff | |
| 6,523,069 B1 | 2/2003 | Luczycki et al. | |
| 6,525,732 B1 | 2/2003 | Gadh et al. | |
| 6,529,210 B1 | 3/2003 | Rees | |
| 6,564,246 B1 | 5/2003 | Varma et al. | |
| 6,578,054 B1 | 6/2003 | Hopmann et al. | |
| 6,591,247 B2 | 7/2003 | Stern | |
| 6,591,278 B1 | 7/2003 | Ernst | |
| 6,601,087 B1 | 7/2003 | Zhu et al. | |
| 6,604,134 B2 | 8/2003 | Haury | |
| 6,606,479 B2 | 8/2003 | Cook et al. | |
| 6,608,628 B1 | 8/2003 | Ross et al. | |
| 6,614,458 B1 | 9/2003 | Lambert et al. | |
| 6,629,129 B1 | 9/2003 | Bookspan et al. | |
| 6,640,241 B1 | 10/2003 | Ozzie et al. | |
| 6,654,032 B1 | 11/2003 | Zhu et al. | |
| 6,662,210 B1 | 12/2003 | Schwartz et al. | |
| 6,674,459 B2 | 1/2004 | Ben-Shachar et al. | |
| 6,714,200 B1 | 3/2004 | Talnykin et al. | |
| 6,731,314 B1 | 5/2004 | Cheng et al. | |
| 6,738,076 B1 | 5/2004 | Mandavilli et al. | |
| 6,741,904 B1 | 5/2004 | Gage | |
| 6,748,470 B2 | 6/2004 | Goldick | |
| 6,754,693 B1 | 6/2004 | Roberts et al. | |
| 6,763,501 B1 | 7/2004 | Zhu et al. | |
| 6,769,031 B1 | 7/2004 | Bero | |
| 6,769,130 B1 | 7/2004 | Getsin et al. | |
| 6,785,679 B1 | 8/2004 | Dane et al. | |
| 6,791,549 B2 | 9/2004 | Hubrecht et al. | |
| 6,803,926 B1 | 10/2004 | Lamb et al. | |
| 6,831,635 B2 | 12/2004 | Boyd et al. | |
| 6,839,734 B1 | 1/2005 | Vega-Garcia et al. | |
| 6,851,053 B1 | 2/2005 | Liles et al. | |
| 6,854,493 B2 | 2/2005 | Ichikawa et al. | |
| 6,857,024 B1 | 2/2005 | Chen et al. | |
| 6,859,821 B1 | 2/2005 | Ozzie et al. | |
| 6,892,237 B1 | 5/2005 | Gai et al. | |
| 6,901,448 B2 | 5/2005 | Zhu et al. | |
| 6,928,396 B2 | 8/2005 | Thackston | |
| 6,950,464 B1 | 9/2005 | Shen et al. | |
| 6,989,856 B2 | 1/2006 | Firestone et al. | |
| 7,039,723 B2 | 5/2006 | Hu et al. | |
| 7,043,478 B2 | 5/2006 | Martin et al. | |
| 7,043,529 B1 | 5/2006 | Simonoff | |
| 7,046,269 B2 | 5/2006 | Parker et al. | |
| 7,062,532 B1 | 6/2006 | Sweat et al. | |
| 7,065,249 B2 | 6/2006 | Fushiki et al. | |
| 7,068,309 B2 | 6/2006 | Toyama et al. | |
| 7,069,192 B1 | 6/2006 | Freitag | |
| 7,086,028 B1 | 8/2006 | Davis et al. | |
| 7,092,380 B1 | 8/2006 | Chen et al. | |
| 7,114,172 B2 | 9/2006 | Lord | |
| 7,138,997 B2 | 11/2006 | Balakrishnan et al. | |
| 7,139,798 B2 | 11/2006 | Zircher et al. | |
| 7,149,959 B1 | 12/2006 | Jones et al. | |
| 7,151,551 B2 | 12/2006 | Mandavilli et al. | |
| 7,162,502 B2 | 1/2007 | Suarez et al. | |
| 7,167,182 B2 | 1/2007 | Butler | |
| 7,173,933 B1 | 2/2007 | O'Rourke et al. | |
| 7,176,942 B2 | 2/2007 | Chartier et al. | |
| 7,197,714 B2 | 3/2007 | Janson | |
| 7,210,095 B1 | 4/2007 | Mor | |
| 7,213,051 B2 | 5/2007 | Zhu et al. | |
| 7,225,207 B1 | 5/2007 | Ohazama et al. | |
| 7,234,117 B2 | 6/2007 | Zaner et al. | |
| 7,243,301 B2 | 7/2007 | Bargeron et al. | |
| 7,280,692 B2 | 10/2007 | Fushiki et al. | |
| 7,319,745 B1 | 1/2008 | Firestone | |
| 7,337,093 B2 | 2/2008 | Ramani et al. | |
| 7,337,389 B1 | 2/2008 | Woolf et al. | |
| 7,353,252 B1 | 4/2008 | Yang et al. | |
| 7,356,563 B1 | 4/2008 | Leichtling et al. | |
| 7,363,587 B2 | 4/2008 | Schaeffer et al. | |
| 7,386,557 B2 | 6/2008 | Barga et al. | |
| 7,409,633 B2 | 8/2008 | Lerner et al. | |
| 7,441,198 B2 | 10/2008 | Dempski et al. | |
| 7,447,741 B2 | 11/2008 | AbiEzzi et al. | |
| 7,454,465 B2 | 11/2008 | Manion et al. | |
| 7,458,091 B1 | 11/2008 | Getsin et al. | |
| 7,466,313 B2 | 12/2008 | Kehrle et al. | |
| 7,467,380 B2 | 12/2008 | Kurlander et al. | |
| 7,477,282 B2 | 1/2009 | Firestone et al. | |
| 7,487,211 B2 | 2/2009 | Beavers et al. | |
| 7,487,278 B2 | 2/2009 | Goldick | |
| 7,490,126 B2 | 2/2009 | Ozzie et al. | |
| 7,502,726 B2 | 3/2009 | Panasyuk et al. | |
| 7,516,165 B2 | 4/2009 | Berkowitz et al. | |
| 7,529,780 B1 | 5/2009 | Braginsky et al. | |
| 7,533,134 B2 | 5/2009 | Terry et al. | |
| 7,533,182 B2 | 5/2009 | Wurtzel et al. | |
| 7,535,473 B2 | 5/2009 | Antoine | |
| 7,545,373 B2 | 6/2009 | Knighton et al. | |
| 7,558,846 B2 | 7/2009 | Gu et al. | |
| 7,559,017 B2 | 7/2009 | Datar et al. | |
| 7,564,856 B2 | 7/2009 | Bendelac et al. | |
| 7,568,034 B1 | 7/2009 | Dulitz et al. | |
| 7,577,588 B2 | 8/2009 | Nykamp | |
| 7,577,657 B2 | 8/2009 | Earhart | |
| 7,580,867 B2 | 8/2009 | Nykamp | |
| 7,627,808 B2 | 12/2009 | Blank et al. | |
| 2001/0007095 A1 | 7/2001 | Kehrle et al. | |
| 2001/0032140 A1 | 10/2001 | Hoffman | |
| 2001/0044335 A1 | 11/2001 | Satake | |
| 2001/0049721 A1 | 12/2001 | Blair et al. | |
| 2002/0010655 A1 | 1/2002 | Kjallstrom | |
| 2002/0016725 A1 | 2/2002 | Eichstaedt et al. | |
| 2002/0019943 A1 | 2/2002 | Cho et al. | |
| 2002/0049786 A1 | 4/2002 | Bibliowicz et al. | |
| 2002/0049847 A1 | 4/2002 | McArdle et al. | |
| 2002/0072955 A1 | 6/2002 | Brock | |
| 2002/0072993 A1 | 6/2002 | Sandus et al. | |
| 2002/0073208 A1 | 6/2002 | Wilcock et al. | |
| 2002/0083098 A1 | 6/2002 | Nakamura | |
| 2002/0083145 A1 | 6/2002 | Perinpanathan | |

| | | | |
|---|---|---|---|
| 2002/0085030 A1 | 7/2002 | Ghani | |
| 2002/0093538 A1 | 7/2002 | Carlin | |
| 2002/0109681 A1 | 8/2002 | Elber | |
| 2002/0122112 A1 | 9/2002 | Mallart et al. | |
| 2002/0124252 A1 | 9/2002 | Schaefer et al. | |
| 2002/0129106 A1 | 9/2002 | Gutfreund | |
| 2002/0149617 A1 | 10/2002 | Becker | |
| 2002/0152271 A1 | 10/2002 | Chafle et al. | |
| 2002/0173867 A1 | 11/2002 | Duncan et al. | |
| 2002/0183878 A1 | 12/2002 | Chartier et al. | |
| 2002/0184111 A1 | 12/2002 | Swanson | |
| 2002/0188678 A1 | 12/2002 | Edecker et al. | |
| 2002/0188679 A1 | 12/2002 | Matous et al. | |
| 2002/0194095 A1 | 12/2002 | Koren | |
| 2003/0018643 A1 | 1/2003 | Mi et al. | |
| 2003/0018702 A1 | 1/2003 | Broughton et al. | |
| 2003/0023754 A1 | 1/2003 | Eichstadt et al. | |
| 2003/0023759 A1 | 1/2003 | Littleton et al. | |
| 2003/0031380 A1 | 2/2003 | Song | |
| 2003/0037148 A1 | 2/2003 | Pedersen et al. | |
| 2003/0038798 A1 | 2/2003 | Besl et al. | |
| 2003/0038843 A1 | 2/2003 | Smith | |
| 2003/0090530 A1* | 5/2003 | Ramani et al. | 345/848 |
| 2003/0093286 A1 | 5/2003 | Myers et al. | |
| 2003/0100964 A1 | 5/2003 | Kluge et al. | |
| 2003/0103089 A1 | 6/2003 | Ramani et al. | |
| 2003/0112273 A1 | 6/2003 | Hadfield et al. | |
| 2003/0120690 A1 | 6/2003 | Schaeffer et al. | |
| 2003/0126211 A1 | 7/2003 | Anttila et al. | |
| 2003/0167293 A1 | 9/2003 | Zhu et al. | |
| 2003/0179230 A1 | 9/2003 | Seidman | |
| 2003/0182168 A1 | 9/2003 | Lyons | |
| 2003/0195803 A1 | 10/2003 | Ketonen | |
| 2004/0003043 A1 | 1/2004 | Rajamony et al. | |
| 2004/0024820 A1 | 2/2004 | Ozzie | |
| 2004/0041812 A1 | 3/2004 | Roberts et al. | |
| 2004/0041841 A1 | 3/2004 | LeMogne et al. | |
| 2004/0046760 A1 | 3/2004 | Roberts et al. | |
| 2004/0113945 A1 | 6/2004 | Park et al. | |
| 2004/0128697 A1 | 7/2004 | Wood et al. | |
| 2004/0135820 A1 | 7/2004 | Deaton et al. | |
| 2004/0143603 A1 | 7/2004 | Kaufmann et al. | |
| 2004/0183878 A1 | 9/2004 | Roberts | |
| 2004/0193425 A1 | 9/2004 | Tomes | |
| 2005/0078170 A1 | 4/2005 | Firestone | |
| 2005/0078171 A1 | 4/2005 | Firestone et al. | |
| 2005/0089023 A1 | 4/2005 | Barkley et al. | |
| 2005/0091179 A1 | 4/2005 | Kalthoff et al. | |
| 2005/0091435 A1 | 4/2005 | Han | |
| 2005/0097000 A1 | 5/2005 | Freishtat et al. | |
| 2005/0232168 A1 | 10/2005 | Schauser et al. | |
| 2005/0234943 A1 | 10/2005 | Clarke | |
| 2005/0235014 A1 | 10/2005 | Schauser et al. | |
| 2005/0248652 A1 | 11/2005 | Firestone et al. | |
| 2005/0251462 A1 | 11/2005 | Nykamp | |
| 2006/0002681 A1 | 1/2006 | Spilo et al. | |
| 2006/0010125 A1 | 1/2006 | Beartusk et al. | |
| 2006/0080432 A1 | 4/2006 | Spataro et al. | |
| 2006/0101022 A1 | 5/2006 | Yu et al. | |
| 2006/0265496 A1 | 11/2006 | Freitag | |
| 2007/0127700 A1 | 6/2007 | Chen et al. | |
| 2007/0127791 A1 | 6/2007 | Ernvik et al. | |
| 2007/0134644 A1 | 6/2007 | Jones et al. | |
| 2007/0180021 A1* | 8/2007 | Hickman et al. | 709/203 |
| 2007/0248261 A1 | 10/2007 | Zhou et al. | |
| 2008/0028323 A1 | 1/2008 | Rosen et al. | |
| 2008/0046828 A1 | 2/2008 | Bibliowicz et al. | |
| 2008/0154908 A1 | 6/2008 | Datar et al. | |
| 2008/0209021 A1 | 8/2008 | Shamma | |
| 2008/0270555 A1 | 10/2008 | Reynolds et al. | |
| 2009/0179895 A1 | 7/2009 | Zhu et al. | |
| 2009/0187389 A1 | 7/2009 | Dobbins et al. | |

FOREIGN PATENT DOCUMENTS

| | | |
|---|---|---|
| EP | 0 667 972 A1 | 8/1995 |
| EP | 0717544 A2 | 6/1996 |
| EP | 0 898 756 A1 | 3/1999 |
| EP | 1217560 A1 | 6/2002 |
| EP | 0870234 B1 | 3/2003 |
| EP | 1212679 B1 | 6/2003 |
| WO | 9619064 A3 | 6/1996 |
| WO | 9921117 A1 | 4/1999 |
| WO | 9957900 A1 | 11/1999 |
| WO | 0140893 A3 | 6/2001 |
| WO | 02071173 A2 | 9/2002 |
| WO | WO03/041033 A1 | 5/2003 |
| WO | 04001618 A1 | 12/2003 |
| WO | WO2004/015897 A2 | 2/2004 |
| WO | 2004083977 A1 | 9/2004 |

OTHER PUBLICATIONS

Rosenbloom, "A Game Experience—in Every Application", Communications of the ACM, Jul. 2003, vol. 46, Issue 7, p. 28-31.

Wang et al., "A Java 3D-Enabled Cyber Workspace", Communications of the ACM, Nov. 2002, vol. 45, Issue 11, p. 45-49.

Chang et al., "A Pilot Study of Role-Interplay in a Web Based Learning Environment", Educational Media International, Mar. 2002, vol. 39, Issue 1, p. 75-85.

Yanrong et al., "An Asynchronous and Synchronous Coupling Approach in Networked Rapid Product Development", International Journal of Advanced Manufacturing Technology, Sep. 2003, vol. 22, Issue 1/2, p. 26-32.

Kolatkar et al., "A 3D Community-Based, Real-Time Collaboration Tool for Scientific Research and Training", PLoS One, 2008, vol. 3, Issue 2, p. 1-9.

Qingjin et al., "Enchanced Integrated Manufacturing Systems in an Immersive Virtual Environment", Proceedings of the Institution of Mechanical Engineers—Part B—Engineering Manufacture, Mar. 2007, vol. 221, Issue 3, p. 477-487.

Benford et al., "Example CVEs", Communications of the ACM, Jul. 2001, vol. 44, Issue 7, p. 82-83.

Madsen et al., "Experiences Using Cooperative Interactive Storyboard Prototyping", Communications of the ACM, Jun. 1993, vol. 36, Issue 6, p. 57-64.

Robertson et al., "Information Visualization Using 3D Interactive Animation", Communications of the ACM, Apr. 1993, vol. 36, Issue 4, p. 57-71.

Jiang et al., "Internet Based Design System for Globally Distributed Concurrent Engineering", Cybernetics & Systems, Oct. 2001, vol. 32, Issue 7, p. 737-754.

Huang et al., "Web-Based Collaborative Conceptual Design", Journal of Engineering Design, Jun. 1999, vol. 10, Issue 2, p. 183-194.

Li et al., "Web-Based Interactive 3D Visualization for Computer Graphics Education", International Journal of Distance Education Technologies, Jul.-Sep. 2003, vol. 1, Issue 3, p. 69.

Li et al., "A Distributed Feature-based Environment for Collaborative Design", Singapore Institute of Manufacturing Technology, Systemics, Cybernetics and Informatics, vol. 1, No. 1, p. 3-8.

"Visual Network Design Announces Rackwise, Web-Based Service Easily Configures, Visualizes and Documents Network Racks", Business Editors/High Tech Writers, Business Wire, New York, Dec. 8, 2003, p. 1 http://proquest.umi.com/pqdweb?did=484723771&sid=3&Fmt=3&clientId=19649&RQT=309&VName=PQD.

PCT International Search Report for Application No. PCT/CA2005/000680, International filing date: May 4, 2005, Applicant: Diginiche Inc. et al., Date of Mailing: Aug. 22, 2005.

PCT International Search Report for Application No. PCT/CA2007/000048, International filing date: Jan. 15, 2007, Applicant: Diginiche Inc. et al., Date of Mailing: May 22, 2007.

Final Office Action on U.S. Appl. No. 11/062,920, mailed Dec. 12, 2008.

Final Office Action on U.S. Appl. No. 10/957,619, mailed Jan. 30, 2008.

Non-Final Office Action on U.S. Appl. No. 10/957,619, mailed May 18, 2007.

Non-Final Office Action on U.S. Appl. No. 10/957,619, mailed Sep. 19, 2008.

Non-Final Office Action on U.S. Appl. No. 11/062,920, mailed Mar. 24, 2008.

Non-Final Office Action on U.S. Appl. No. 12/706,446, mailed Apr. 19, 2012.

Notice of Allowance for U.S. Appl. No. 11/062,920, mailed Apr. 16, 2009.
Notice of Allowance on U.S. Appl. No. 10/957,619, mailed Apr. 24, 2009.
Notice of Allowance on U.S. Appl. No. 12/533,126, mailed Oct. 20, 2010.
Notice of Allowance on U.S. Appl. No. 12/533,126, mailed Nov. 4, 2009.
Notice of Allowance on U.S. Appl. No. 12/706,331, mailed Oct. 26, 2011.
Notice of Allowance on U.S. Appl. No. 12/706,331, mailed Sep. 6, 2011.
http://www.waveprotocol.org/whitepapers/operational-transform.

* cited by examiner

METHOD AND APPARATUS FOR INTERACTIVE AND SYNCHRONOUS DISPLAY SESSION

FIELD OF THE INVENTION

This invention relates to computer network based systems for interactively disseminating information and for collaborative designing products. The invention may be used to interactively share information about products, marketing and advertising displays and many other types of information. The invention may also be used by two or more people to collaboratively design a product, product display or marketing or advertising system.

BACKGROUND OF THE INVENTION

The design and development of consumer and other products is conducted on increasingly short timelines. At the same time these products are increasingly complex and customized for different markets and users. For example, some athletic shoes are customized for different geographic markets in different color combinations. Shoe manufacturers build numerous prototype shoes in the different color combination for each market and provide the appropriate prototype to potential retail vendors in each market. The retail vendors comment on the color combination and the manufacturer and vendors may modify and make new prototypes before a final color combination is chosen for a particular market. This iterative approach relies on making and distributing physical prototypes and is both costly and time consuming. The problem is exacerbated if there are several potential retail vendors participating in the design of a product for a particular market. Even where a vendor does not participate in the actual design of products, the vendor may wish to see a sample of the product before the vendor will agree to sell it. The cost of making numerous customized prototypes can be high.

Accordingly, there is a need for an improved system that allows information about new products to be delivered to potential retail vendors and other potential purchasers of the products. In addition, there is a need for a system that improves the ability of manufacturers and product vendors and others to collaboratively design or develop a product.

Consumers often wish to obtain information about a product prior to, during and after purchasing a product. Consumers may need this information to make an informed purchasing decision. Many consumer and other products are sold with instructions for the assembly or use of the product. In many cases, a consumer may require additional information to complete the assembly of the product or to use the product. In addition, a product supplier (or manufacturer) may find it necessary or desirable to revise the information included with a product or to supplement this information with additional instructions. Some suppliers provide an automated information service (typically on a website) that allows a consumer to download such additional information. Such a system allows a consumer to obtain only limited and pre-determined or pre-recorded information. In other cases, a supplier may provide a help desk service allowing consumers to contact a help desk attendant, who can speak to the consumer to help them with a product assembly or use problem. Such a system is deficient in that it provides only for spoken communication between the consumer and the attendant. There is a need for an improved system for providing information to consumers.

The same deficiencies exist in design and collaboration tools available to advertise and market products. For example, businesses that operate multiple retail outlets often prefer to organize some or all of the outlets in a similar manner to allow consumers to become familiar with the store layout and to promote product awareness and sales based on product placement within the store. Presently, such "planograms" of the layout of product displays are exchanged between those who design the planogram and those who implement it in a particular retail outlet. Collaboration between such persons is complicated and slowed. There is a need for an improved system for collaboratively designing and for disseminating such marketing and advertising information.

SUMMARY OF THE INVENTION

The present invention provides a system for distributing information about products from to consumers or other persons interested in the products.

The term "consumer" is used generically herein to describe a person who may have an interest in learning about a product. In addition to a typical consumer of a product, such persons may include employees responsible for stocking product in shelves according to a planogram, suppliers of components of products or equipment used to display or market products, managers responsible for designing products and marketing programs for products and various other persons who have an interest in the products.

The term "product" is used generically herein to refer to any device, product, system, arrangement or service that could be advertised, displayed or collaboratively designed using one or more graphical images. For example, the term product includes a planogram, floor plan, a consumer product and any other article of commerce.

The invention may be used to distribute information that may be illustrated graphically using two-dimensional (2D) or three-dimensional (3D) graphical images. The information that is distributed may related to any device, product, system, arrangement or service that may be illustrated graphically. For example, any physical retail or consumer product is appropriate. The invention may be used with facilities such as hotel rooms, banquet halls to illustrate their appearance or design. The invention may also be used to illustrate the operation of machinery or equipment. The graphic images may be two-dimensional, three-dimensional or moving images such as video clips or animations. The images may be photographs, drawings, architectural plans, models or any other type of graphical rendition.

In a first embodiment, the present invention provides a system and methods for conducting an interactive information session. The interactive information session typically includes a consumer seeking information about a product and an attendant who provides information to the consumer.

The supplier assembles product data about the product and records the product data in a product database in a system server. The product data may include graphic, video, audio, text and other information about the product. In some embodiments, the product data includes at least one 3D graphic image of the product. In other embodiments, the product data includes at least one 2D graphic image of the product. Other embodiments may include numerous 2D and 3D graphic images of the product. The product data may also include information about optional components that may be used with the product or other optional aspects such as different color schemes, layout options, sizing considerations, etc.

The consumer uses a consumer computer to participate in the interactive information session. Similarly, the attendant uses an attendant computer to participate in the interactive information session. When the interactive information session is initiated, the product data is transmitted from the system server to the consumer computer and to the attendant computer. Consumer client software operating on the consumer computer is used to display or playback the product data on the consumer computer. Attendant client software operating on the attendant computer is used to display or playback the product data on the attendant computer. The display or playback of the product data on the consumer and attendant computers is synchronized. The product data includes initial display instructions which describe the parts of the product data are to displayed when the product is first transmitted to a consumer or attendant computer and how those parts are to be displayed.

At least one interactive communication link is also established between the consumer computer and the attendant computer. The interactive communication link may be a voice chat session or a text chat session. The interactive communication link is operative at least during portions of the interactive information session to permit the consumer and the attendant to participate in live interactive communication with each other.

The consumer and the attendant participating in an interactive information session may be referred to as "participants" in the session. One of the participants is in control of the interactive information session at any particular time. That person is the "controller" of the session and the controller's computer is designated the controlling computer. The other person is a "viewer" of the session and the viewer's computer is designated the viewing computer.

The controller is able to control and manipulate the display and playback of the product data on the controlling computer. For example, the controller may manipulate two dimensional or three dimensional images displayed on the controlling computer, initiate and control the playback of pre-recorded information and annotate displayed images. When the controller performs any such manipulation or control activity, or while the controller performs a manipulation, an Update Message is transmitted from the controlling computer to the system server describing the manipulation or control activity.

The system server transmits a corresponding Update Message to the viewing computer. The Update Message transmitted to viewing computer may be identical to or may be a version of the Update Message received from the controlling computer. The viewing computer is responsive to the Update Message to change the display or playback of the product data on the viewing computer to correspond to described manipulation or control activity. In this way, the display or playback of the product on the controlling and viewing computers is kept generally synchronized.

For example, if the controller has a 3D image of the product displayed on the controlling computer and manipulates the camera position from which the image is displayed, a Camera Position Update message, which is one type of Update Message, is transmitted from the controlling computer to the system server and then to the viewing computer. The Camera Position Update message indicates the new camera position and may include additional information such as the time period over which the viewing computer should display the transition from the previous camera position to the new camera position. On the viewing computer, the client software updates the display of the image to correspond to the new camera position. If the transition from the old camera position to the new camera position is to be animated, an animation is calculated and displayed at the viewing computer. The comparatively computation and data intensive activities of calculating and displaying the animation are performed entirely at the viewing computer in response to the comparatively lightweight Camera Position Update message. As a result, it is possible to keep the display of the image on the controlling computer and the viewing computer generally synchronized without substantial latency between them. If the controller conducts a manipulation of the image over an extended time, then a series of Camera Position Update messages, spaced apart in time by an update period may be sent during the manipulation. A Camera Position Update message is also sent at the end of the manipulation. A skilled person will be able to select an update period that provides sufficient synchronization between the controlling and the viewing computers.

The attendant and the consumer may change roles as controller and viewer. In some embodiments, one of them may be able to designate who will be the controller and who will be the viewer. In other embodiments, either of them may be permitted to take control of the interactive information session.

An interactive information session may include any number of consumers and at least one attendant. Any one of the participants in such an interactive information session may be the controller of the session. The remaining participants are viewers of the session. When the controller manipulates the product displayed on the controller's computer, and Update Message is transmitted from the controller's computer to the system server. The system server then propagates a corresponding Update Message to all of the viewing computers. This allows all of the participants in an interactive information session to effectively view the same product data that is displayed on the controlling computer.

In another embodiment of the invention, two or more users are able to participate in an interactive product design session. Each user operates a user computer that receives product data from a system server. At any time, one user is in control of the product design session and is able to manipulate the display or playback of the product data. That use is the controller of the interactive product design session and that user's computer is the controlling computer. In this embodiment, the product data may also include alternative or optional configurations and optional components for the product. The controller may select between the alternative configurations and may choose to include or exclude optional configurations or components. The controller may also be permitted to change other aspects of the design, such as the color of various parts of the product, the choice of materials, etc. As the controller changes the product design, the changes are transmitted to the system server in Update Messages, which are then propagated to each other user's computers. In this way, each user is able to view the product design as it changes and evolves. At different times, different users may be given or may take control of the session.

During at least part of the interactive product design session, an interactive communications link is established between the user computers with the server computer acting as an intermediary. All voice and text data is transmitted from a user computer to the system server and is then propagated to the other user computers where it is displayed or played back.

The consumer and the attendant, in the first embodiment, and the users in the latter embodiment, are thus able to interactively communicate while at the same time manipulating the product data displayed or played back on their computers. The display or playback of product data is generally synchronized so that each person can see the same information and hearing or read the same interactive discussion at essentially the same time.

In some embodiments, the users (including the consumer and the attendant in the first embodiment described above) may be permitted to save a view of an image as it is displayed on the users' computer displays at the time. The controller and viewers may be permitted to save views. Information about each view is saved by the system server based on the camera positions and design selections at the time the view is saved. Information about each stored view is stored on the user computers and subsequently, the controller may select a particular view to be displayed. The controlling computer sends a Display Stored View message to the system server which is then propagated to each user's computer. The selected view is then displayed on each user's computer.

In another embodiment, the invention provides a method for providing interactive product information to a consumer comprising: storing product data relating to the product in a product database; transmitting the product data to a consumer computer operated by the consumer, wherein at least some of the product data is displayed on the consumer computer by consumer client software; transmitting the product data to an attendant computer operated by an attendant, wherein at least some of the product data is displayed on the attendant computer by attendant client software, the product data displayed on the attendant computer corresponding to the product data displayed on the consumer computer; establishing an interactive communication link between the consumer computer and the attendant computer for allowing the consumer and the attendant to communicate interactively; and synchronizing the display of at least some of the product data on the consumer computer with the display of corresponding product data on the attendant computer.

In another embodiment, the invention provides a method for an interactive product design session between two or more user computers comprising: storing product data relating to a product in a product database; transmitting the product data to each of the user computers, wherein at least some of the product data is displayed on each user computer by user client software; establishing an interactive communication link between the consumer computer and the attendant computer for allowing the consumer and the attendant to communicate interactively; and synchronizing the display of at least some of the product data on all of the user computers.

These and other aspects of the invention are further description below.

BRIEF DESCRIPTION OF THE DRAWINGS

A preferred embodiment of the present invention will now be described in detail with reference to the drawings, in which.

DETAILED DESCRIPTION OF EXEMPLARY EMBODIMENTS

Figure 1:
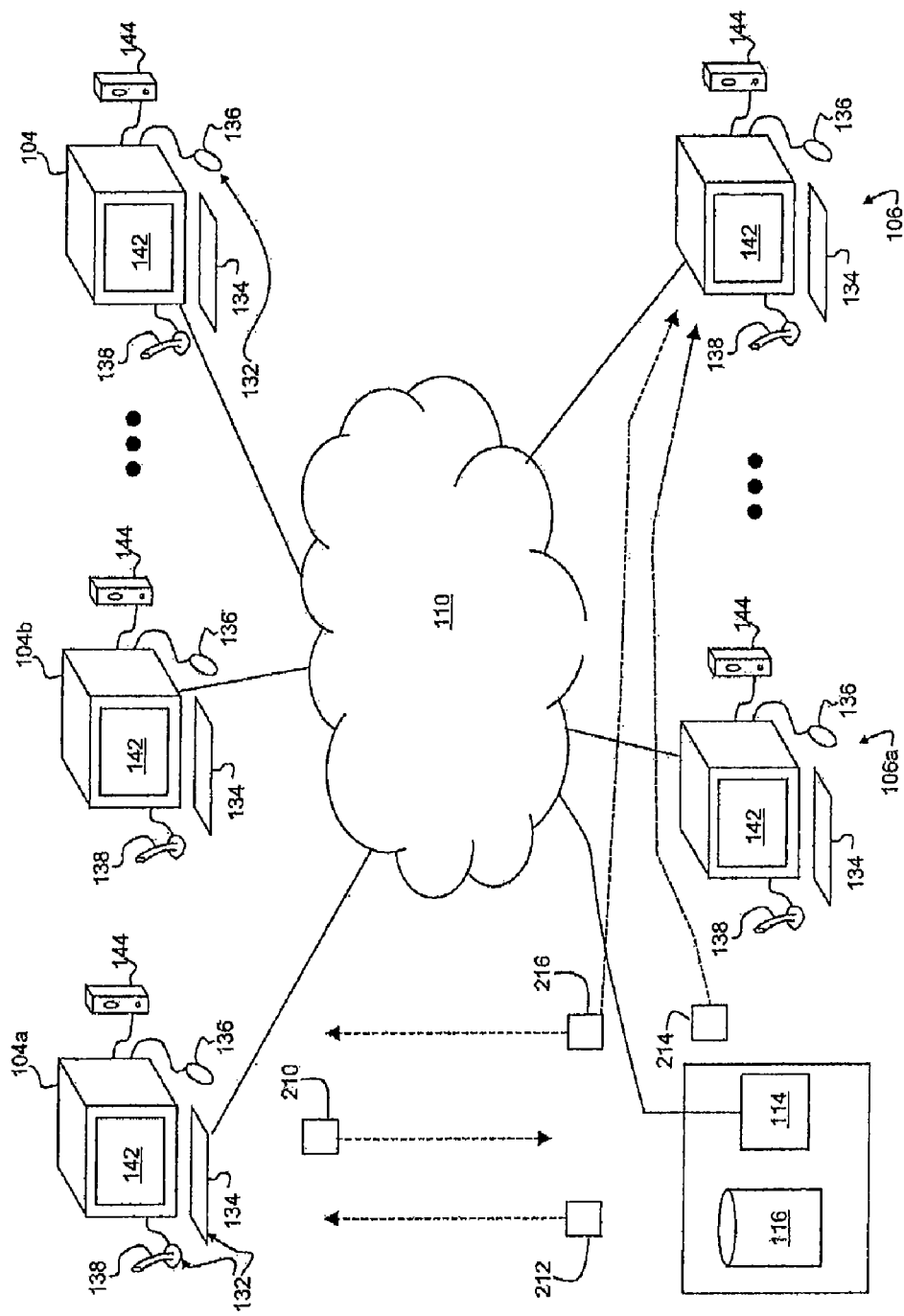
FIG. 1 illustrates a system according to a first embodiment of the present invention.

Reference is first made to FIG. 1, which illustrates a system 100 for providing interactively providing information to consumers (not shown). System 100 includes a system server 102, one or more consumer computers 104 and one or more attendant computers 106.

System 100 also includes a communication network 110, which may be the Internet, a local area network or any other communication network capable of facilitating communication between computing devices.

The system server 102 includes a server communication module 114 and a product database 116. Server communication module 114 is coupled to the network 110.

Consumers use the consumer computers 104 to access system 100. Each consumer computer 104 includes one or more input devices 132. For example, consumer computer 104a includes a keyboard 134, mouse 136 and a microphone 138. Consumer computer 104b includes a keyboard 134 and a mouse 136. Each consumer computer 104 also includes one or more output devices 140. For example, consumer computers 104a and 104b include a display screen 142 and a speaker 144.

Each attendant computer 106 also includes input devices 132 including a keyboard 134, mouse 136 and a microphone 138. Each attendant computer 106 also includes output devices including a display screen 142 and a speaker 144.

Figure 2:
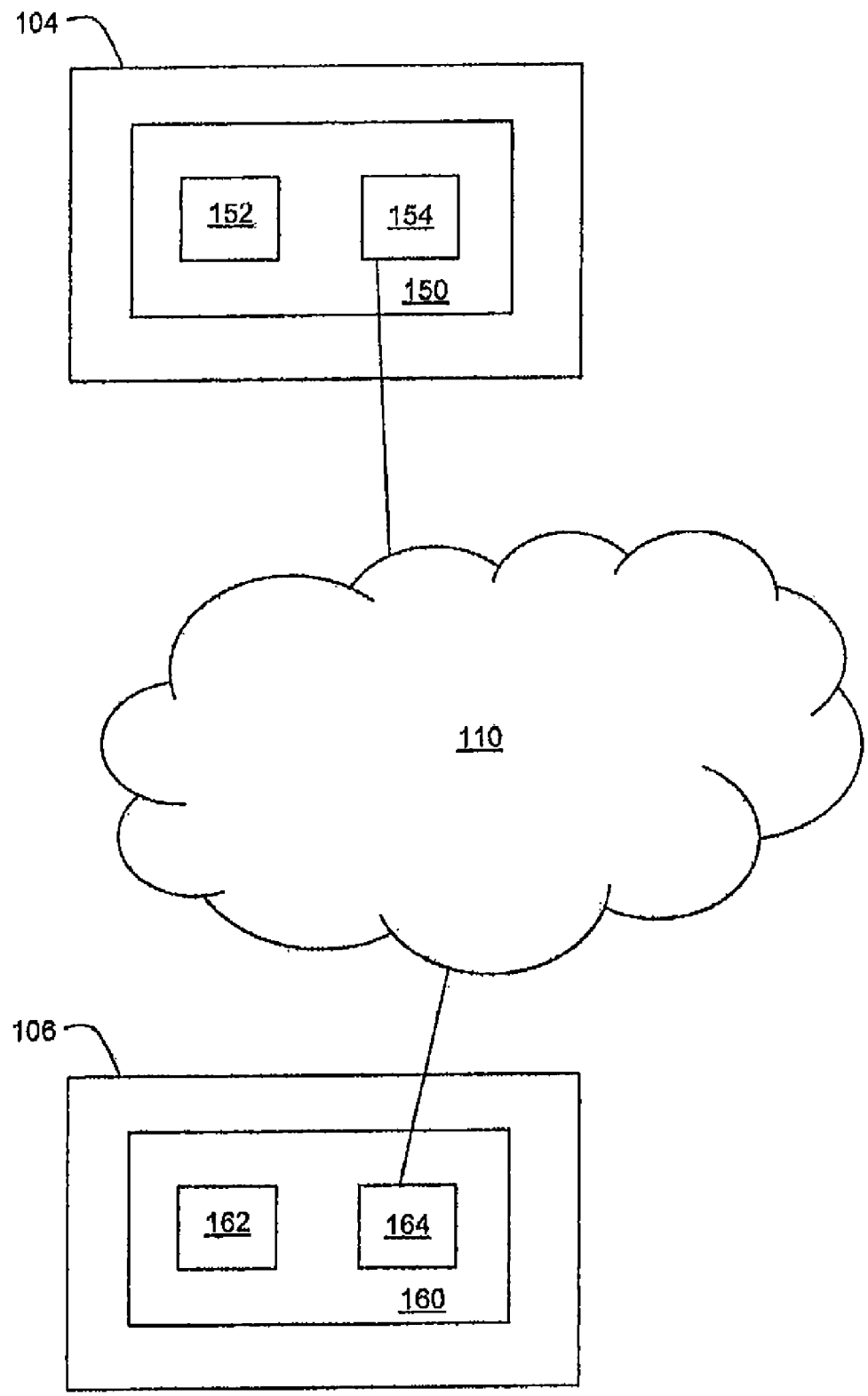
FIG. 2 illustrates consumer client software and attendant client software forming part of the system of FIG. 1.

Referring to FIG. 2, each consumer computer 104 is used to execute consumer client software 150. Consumer client software 150 includes a consumer media module 152 and a consumer communication module 154. Consumer communication module 154 is coupled to the network 110.

Each attendant computer 106 is used to execute attendant client software 160. Attendant client software 160 includes an attendant media module 162 and an attendant communication module 164. Attendant communication module 164 is coupled to the network 110.

Referring to FIG. 1, system 100 is operated by or on behalf of a product supplier (not shown), who may be a product manufacturer, wholesaler, retailer or other person or company that has an interest in the sales or marketing of products.

Consumers (not shown) access system 100 by using the consumer computers 104, which may be the consumer's own personal computers, may be located in retail stores or may be another computing device, such as a television set-top box, a portable personal data assistant or another type of computer. Typically, a consumer will access system 100 to obtain information about a product. The consumer may use system 100 in advance of a potential purchase to learn about the product, while purchasing a product or after purchasing the product to obtain assistance when assembling or using the product.

The attendant computers are operated by attendants (not shown). The attendants communicate interactively with consumers using system 100 to provide information to consumers about the supplier's products.

A consumer requests access to system 100 to obtain more information about a product. In response to the request, the consumer's computer 104 is coupled to server 102 (which may also be a world-wide-web server that hosts the supplier's website), which in turn allocates and couples an attendant computer 106 to the consumer's computer 104. The consumer and the attendant operating the allocated attendant computer engage in a text or voice chat and the attendant is able to provide the consumer with information in response to the consumer's requests. The consumer is thus able to obtain customized information that may otherwise not be available to the consumer, or which may not be available on a convenient, timely basis.

Figure 3:
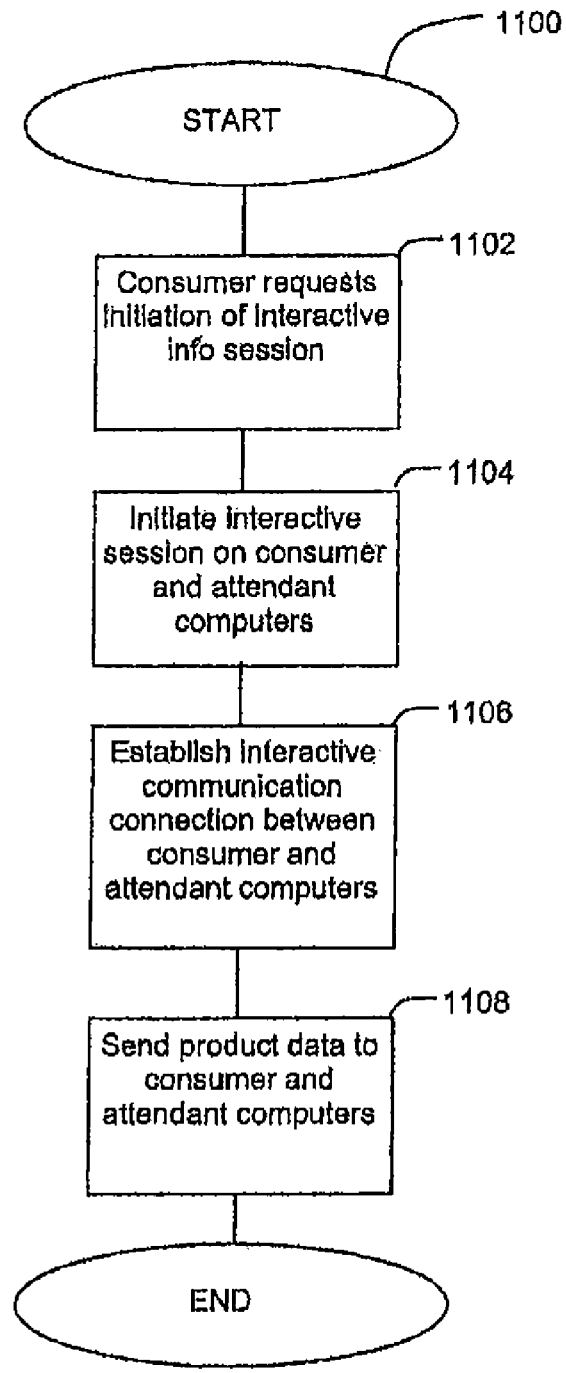
FIG. 3 is a flowchart illustrating a method of initiating the use of the system of FIG. 1.

Reference is next made to FIG. 3, which illustrates a method 1100 that allows a consumer to request information about a product using system 100 and which couples the consumer's computer 104 to an attendant computer 106, establishing an interactive information session between them.

Method 1100 begins in step 1102, in which the consumer makes a request to interactively obtain information about a product. Typically, the consumer will make this request while using the consumer computer 104 to view information about a product on the supplier's website. Product information on websites is limited to previously prepared information such as text, audio and two or three dimensional images that are pre-determined by the supplier. Such pre-determined, previously recorded information is referred to herein as pre-recorded information. The pre-recorded information may include animations that demonstrate how a product can be assembled or used. However, such websites cannot provide dynamically generated, interactive and customized information that is provided to the consumer in response to the consumer's request. To provide dynamic additional information, the supplier may use the present invention.

The supplier may configure a button or other control on a web page to allow the consumer to initiate use of system 100. For example, the consumer may click on a button marked "Obtain interactive multi-media information about this product" on a web page relating to the product to interactively obtain information about the product. When the consumer does so, the button or control is configured to transmit an Initiate Interactive Information Service message 210 (FIG. 1) from the consumer's computer 104 to the system server 102. The Initiate Interactive Information Service includes the following information:

(a) A reference to the consumer's computer 104. This may be an IP address or any other information that the system server 102 can use to transmit information to the consumer computer 104. Method 1100 will be explained with reference to consumer computer 104a.

(b) A reference to the product for which the consumer has requested additional information.

The use of a button on a web page to initiate the use of system 100 is only an example, and step 1102 may include the use of any mechanism that allows a consumer to initiate the use of system 100. For example, system 100 may be initiated automatically when a consumer accesses a web page by accessing a specific URL, by entering a keyboard command, a voice command or any other mechanism for transmitting the Initiate Interactive Information Service message 210 to the system server 102. Access to system 100 may be restricted and a consumer may be required to enter a user or account identification and a password.

Method 1100 then proceeds to step 1104, in which the system server 102 initiates execution of client software on the consumer computer 104 and on an attendant computer 106.

The server computer transmits an Initiate Consumer Session message 212 (FIG. 1) to the consumer computer 104a. In response to the Initiate Consumer Session message 212, the consumer client software 150 opens a display window 170 (FIG. 4) on the consumer computer 104a. In the present embodiment, the consumer client software 150 may be configured to operate within a browser such as Internet Explorer™, Safari™ or Netscape™ Browser. In this case, the browser may initiate the execution of the consumer client software 150 in response to the Initiate Consumer Session message 212. The consumer client software 150 opens the display window 170 as a browser window. In another embodiment of the present invention, the consumer client software 150 may operate independently of a browser and may open a display window 170 directly within the operating system of consumer computer 104a.

In step 1104, the system server 102 allocates an attendant computer 106 that can be linked to consumer computer 104a. Typically, a group of attendants will operate a group of attendant computers 106. System server 102 selects one of the attendant computers 106 that is not already linked to another consumer computer 104. For the purpose of the present example, the server allocates attendant computer 106b to be coupled to consumer computer 104a. The server computer 102 also transmits an Initiate Attendant Session message 214 (FIG. 1) to the attendant computer 106b. A display window 190 (FIG. 4) is opened on the attendant computer 106b in a manner similar to the opening of the display window 170 on the consumer computer 104a. The attendant client software 160 may operate within a browser or directly in the operating system of attendant computer 106b.

Method 1100 then proceeds to step 1106, in which at least one interactive communication link is established between consumer computer 104a and attendant computer 106b.

An interactive audio communication link may be established between the consumer computer 104a and the attendant computer 106b to permit voice communication between the attendant and the consumer. The server computer 102 acts as an intermediary in the interactive audio communication link. Audio data from the consumer computer 104a is first transmitted to the system server 102, which then transmits the audio data (or corresponding audio data) to the attendant computer 106b. The audio data is then played at the attendant computer 106b. Similarly, audio data from the attendant computer originating from the attendant computer 106b is transmitted to the system server 102, which then transmits the audio data to the consumer computer 104a and then played at the consumer computer 104a. This allows the consumer and attendant to speak to one another. For example, the audio communications link may be established using Voice over Internet Protocol ("VoIP"), which is well understood by skilled persons, or using any other mechanism or technology for establishing a two-way voice chat connection between the consumer computer 104a and the attendant computer 106b.

As an alternative to an audio communication link, or in addition to an audio communication link, an interactive text communication link may be established between the consumer computer 104a and the attendant computer 106b, with the system server 102 acting as an intermediary. A text communication link allows the consumer and the attendant to engage in a text chat.

In the present embodiment, the system server 102 is an intermediary in the interactive communication link. As a result, the system server 102 may optionally record the voice or text data exchanged between the attendant and the consumer.

In another embodiment, the system server 102 may instruct the consumer computer 104a and the attendant computer 106b to establish an interactive communication link directly between them. If the system server 102 does not have access to the audio or text information exchanged between the consumer computer 104a and the attendant computer 106b, the system server 102 will not be able to record this information.

In the present exemplary system 100, an interactive audio communication link is established if possible. In the present embodiment, all of the attendant computers 106 are equipped with a microphone and a speaker (which may be integrated into a headset worn by an attendant using the attendant computer) to allow the attendants to participate in a voice chat over the interactive audio communication link. If the consumer computer 104a is capable of participating in a voice chat with the allocated attendant computer 106b, then an interactive audio communication link is established. Otherwise an interactive text communication link is established between the consumer computer 104a and the attendant computer 106b. In other embodiments, both interactive audio and text communication links may be established.

In other embodiments, some or all of the attendant computers 106 may not be configured for interactive voice communication. In this case, an interactive text communication link is created between the consumer computer 104a and the attendant computer 106b.

The consumer media module 152 and the consumer communication module 154 cooperate to facilitate text or voice chat connections. The consumer media module 152 includes software that is capable of capturing audio at the consumer computer 104 and of playing audio received from the system server 102. Similarly, the consumer media module is capable of capturing text entered by the consumer at the consumer computer 104 and of displaying text information received from the system server 102. The captured audio and text information is transmitted to the system server 102 by the consumer communication module 154, which receives the information from the consumer media module. Text and audio information from the system server 102 is received by the consumer communication module 154, which then provides this information to the consumer media module 152 to be played or displayed. The consumer media module 152 and consumer communication module may be distinct software products that communicate with one another through an interface or they may be combined in an integrated software product.

Method 1100 next proceeds to step 1108, in which the server sends product data (FIG. 1) relating to the product identified in the Initiate Interactive Information Session message 210 to consumer computer 104a and the attendant computer 106b. In the present embodiment, the product data 216 includes at least one 3D image of the product. The product data 216 may also include other types of information about the product, such as 2D images, video clips, audio clips, text information or animations. In other embodiments of the invention, the product data 216 may or may not include a 3D image of the product.

The product data is stored in the product database 114 in system server 102 and is recorded in a format that is compatible with the components of the consumer and attendant media modules.

The system server 102 transmits the product data 216 including one or more 3D graphic images of the product identified in the Initiate Interactive Information Session message 210 in step 1102 to the consumer communication module 154, which makes in available to the consumer media module 152 for display and playback. The system server 102 also transmits the product data to the attendant communication module 164, which makes the product data 216 available to the attendant media module 162.

The consumer media module 152 includes media display software capable of displaying or playing the various types of information included in the product data 216. In the present example, the consumer media module 152 includes software capable of displaying a 3D graphic image in the consumer's display window 170. The 3D graphic display software is capable of displaying the 3D image from different viewpoints or camera positions, allowing the 3D graphic image to be rotated and the zoom distance from the 3D image to be changed. In other embodiments, the 3D graphic display software may not be capable of displaying the 3D graphic image from different zoom distances.

In the present embodiment, the 3D graphic display software is the Viewpoint Platform™, which is provided by Viewpoint Corporation of New York, USA. In other embodiments, any system capable of displaying 3D graphic images and allowing them to be displayed from different camera angles may be used. For example, QuickTime Virtual Reality (QuickTime VR™), Macromedia Shockwave™, and other technologies may be used for this purpose. If the display window 170 operates is a browser window, the 3D graphic display software may be a plug-in component installed with the browser software.

In the present embodiment, the consumer media module also includes software capable of displaying 2D images, text information and playing video clips, audio clips and animations. Some of this software may be used to provide the voice or text chat functionality described above. In other embodiments, the software included in the consumer media module will correspond to the different types of information that the product supplier wishes to include in the product data 216.

The attendant media module 162 and the attendant communication module 164 are similar to the consumer media module 152 and consumer communication module in operation. The attendant media module 162 included in the attendant client software 160 is capable of displaying 3D graphic images from different camera angles and optionally, from different zoom distances. Preferably, the 3D graphic display software in the client media module 152 and the attendant media module 162 utilize the same technology. In the present exemplary embodiment, the attendant media module 162 also includes the Viewpoint Platform 3D graphic display software.

The product data 216 may also optionally include information about optional features of the product, such as different color options, additional components that may be purchased and used with the product. For example, if the product is a desk, the product data 216 may include information about different color schemes that the desk is manufactured in, add-on components such as a sliding keyboard drawer, a computer holder or related products such as matching chairs, shelves or filing cabinets. The product data 216 may also optionally include pre-recorded data such video, animations, audio or text information related to the product that describe the assembly or use of the product or are otherwise related to the product. In addition to the consumer media module 152 that is used to display the 3D graphic images included in the product data 216, the consumer client software also includes components that are capable of displaying or otherwise playing (in the case of audio data) other product data transmitted to the consumer computer. If the display window 170 operates within a browser these additional components may also be plug-in components installed with the browser software. If the consumer client software 150 does not include a component required to play a part of the product data, the consumer client software may optionally be configured to download the required component. Otherwise, that part of the product data may not be available to the consumer.

Method 1100 then ends.

Figure 4:
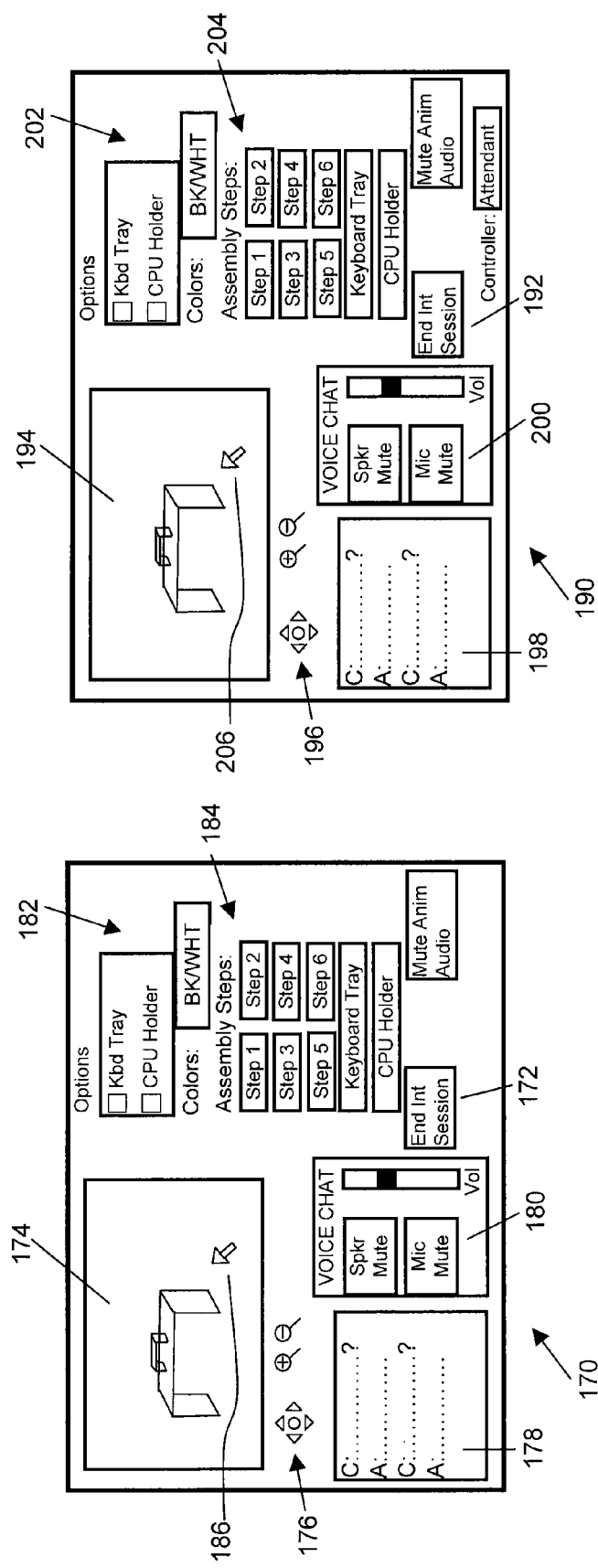
FIG. 4 illustrates a pair of corresponding consumer and attendant display windows during an exemplary use of the system of FIG. 1.

Reference is next made to FIG. 4, which displays an example display window 170 on the display screen 142a of consumer computer 104a and a corresponding example display window 190b on the display screen 142b of an attendant computer 106b when an interactive information session is in progress between a consumer and an attendant.

Display window 170 includes session controls 172, a graphics display 174, graphics display controls 176, a text chat display 178, voice chat controls 180, product option controls 182 and pre-recorded information controls.

The session controls 172 provide an "End Interactive Information Session" button to terminate the interactive information session. If the consumer clicks this button, the interactive information session is terminated and the display window 170 is closed.

The graphics display 174 contains an image of an example product, a computer desk. The graphics display 174 has a pointer 186 on it, which can be used to indicate specific parts of the image displayed on the graphics display 174 and may also be used to change the camera position from which the product is displayed.

The graphics display controls 176 allow the consumer to change the camera position from which the product is displayed in the graphics display 174. In this exemplary embodiment, the graphics display controls 176 include a rotate up, rotate down, rotate left, rotate right, return to original position, zoom in and zoom out controls. In this exemplary embodiment, the camera position may also be changed using a mouse be clicking and dragging on the product display. This functionality is provided using the Viewpoint Platform, and could be provided using other technologies, as described above. This operation is not further explained here as a skilled person will be capable of configuring and using these 3D image display and manipulation tools.

The text chat display 178 contains interactive text that has been typed by the consumer and the attendant during the interactive information session.

The voice chat controls 180 allow the speaker volume and other aspects of the voice chat to be controlled by the consumer.

The product option controls 182 allow the product to be displayed in different forms or modes. In the present example, the computer desk may be displayed with a sliding keyboard tray or a computer holder or any combination of these or none of them. The supplier may sell these components separately and use system 100 to advertise them to consumers who may or who have purchased the computer desk. The desk may also be displayed in three color schemes: black/brown; black/white and brown/white. When a consumer chooses any one of the options or color schemes, the image of the product in the graphics display 174 is changed to match the consumer's choices. Data for each of the options and color schemes is included in the product data 216 delivered to the consumer computer 104*a* in step 1108.

The pre-recorded information controls 184 allow the consumer to play the pre-recorded information included in the product data 216. The specific format and titles of the pre-recorded information is included in the product data 216. In the present example, the pre-recorded information includes eight animations illustrating six assembly steps for the desk and the installation of the keyboard tray and the computer holder. Each animation is accompanied by audio information in which each assembly step is further explained. This information may be used to supplement information provided with the product. The pre-recorded information controls include an animation audio mute button, allowing the audio accompanying the animations to be muted so that the consumer and attendant may continue a voice chat uninterrupted while an animation is played.

Similarly, the attendant display 190 includes session controls 192, a graphics display 194, graphics display controls 196, a text chat display 198, voice chat control 200 and product option controls 202.

The display and operation of the components of the attendant display window 190 is similar to the display of the corresponding components of the consumer window 170. The session controls 192 include one additional "Controller" option, which is explained further below.

During an interactive information session, the displays in the consumer display window 170 and the attendant display window 190 are generally synchronized. One of the consumer or the attendant is in control of the display and any changes made by the person in control (the "controller" of the interactive information session) to the display of the product on the graphics display is generally duplicated in the display of the other person (the "viewer" of the interactive information session). Similarly, if the controller activates any previously recorded information, the same previously recorded information is displayed in the viewer's display window. Typically, animations and video clips will be played in the graphics windows 174 and 194. The consumer and attendant may independently control their own input and output devices (for example, speaker volumes, speaker mute or microphone mute). The interactive communication links (voice chat or text chat or both) are not affected by which person is in control.

The "Controller" option in the attendant's session controls 192 allows the attendant to determine whether the consumer or the attendant will be in control the image of the product in the graphics display windows 174 and 194 and the display or playing of pre-recorded information on both the consumer computer 104*a* and the attendant computer 106*b*.

Figure 6:
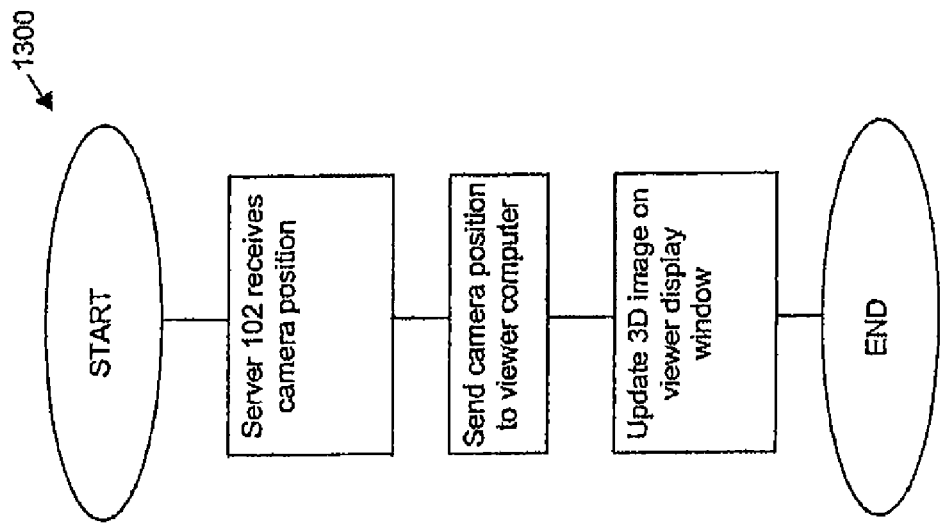
FIGS. 5 and 6 are flowcharts illustrating methods used to synchronize the display of information on the consumer and attendant display windows.
Figure 5:
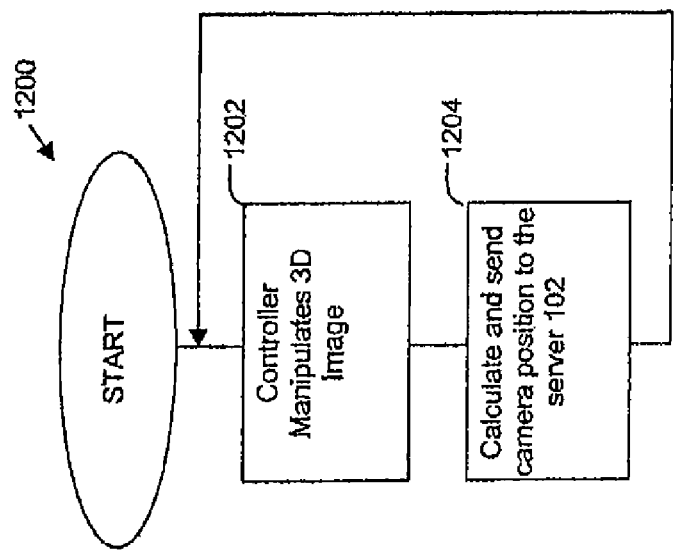

Reference is next made to FIGS. 5 and 6, which illustrate methods 1200 and 1300 that are used keep a 3D image shown in the graphics displays 174 and 194 synchronized between the consumer display window 170 and the attendant display window 190. As described above, the attendant determines whether the consumer or the attendant is in control of the product display in the graphics displays 174 and 194 and the playing of pre-recorded information. Method 1200 is performed on the controller's computer (the "controlling computer"). Method 1300 is performed on the system server 102 and the viewer's computer (the "viewing computer").

Method 1200 begins in step 1202, in which the controller manipulates the product image in the graphics display on the controller's display window. Typically, the controller will do so by using the graphics display controls or by using the controller's mouse. When the controller has completed the manipulation of the product image, or periodically following an "update period" during the manipulation of the product image, method 1200 proceeds to step 1204. The update period will typically be in the range of 250 to 1000 ms, although the time period may be shorter or longer than this range. The controller may continue to manipulate the product image while the remaining steps of method 1200 are performed.

In step 1204, the current camera position is determined. The current camera position may be expressed using any coordinate system. For example, the camera position may be defined using polar coordinates relative to reference horizontal and vertical planes defined with respect to the 3D product image and using an orbit distance (which corresponds to the zoom level). The camera position may alternatively be defined using Cartesian coordinates relative to a reference position. The product data in either case defines the reference planes or position relative to the 3D product image. In some embodiments, the camera position information may include a camera translation that indicates the direction in which the camera is pointed relative to the reference planes or the reference point. A skilled person will be able to calculate a camera position during or following an image manipulation by the controller. The camera position is then transmitted to the system server 102 in a Camera Position Update message.

In the present embodiment, the operation of determining the camera position is performed by the 3D graphic display software in the media module in the controller's client software. This information is transmitted to the system server 102 by the communication module.

Method 1200 then returns to step 1202.

Method 1300 begins in step 1302, in which the system server 102 receives the Camera Position Update message from the controller's computer. The system server records the camera position.

Method 1300 next proceeds to step 1304 in which the system server 102 transmits a copy or a version of the Camera Position Update message to the viewer's computer.

Method 1300 next proceeds to step 1306. In step 1306, the communication module in the viewer's client software receives the Camera Position Update message from the system server 102 and extracts the new camera position from it. The new camera position is passed to the 3D graphic display software in the media module of the viewer's client software. The 3D graphic display software calculates an animation of the 3D image from the current camera position in the viewer's display to the new camera position. If the new camera position was calculated during a manipulation of the 3D image by the controller on the controller's display window 170, then the Camera Position Update message may optionally indicate this. If so, the animation may be calculated to be displayed over the update period. The 3D graphic display software then displays the calculated animation. The viewer's 3D image is thus animated in a manner that generally corresponds to the manipulation of the image by the controller. The animation will not generally be identical to the manipulation of the image by the controller.

Each Camera Position Update message is a comparatively lightweight message. By generating an animation at the viewing computer in response to the Camera Position Update message, the display of the 3D image on the controlling and the viewing computer is generally synchronized by sending the camera position. The viewer's client software is able to generate a corresponding animation since it has the previous camera position, the new camera position and the same 3D image as the controller's client software. This provides an efficient mechanism for synchronizing the displays without transmitting comparatively lengthy graphic image data.

As noted above, a Camera Position Update message may contain some indication of the time over which an animation from the previous camera position to the new camera position should be displayed. In some cases, the new camera position should be displayed immediately, without any animation between the previous and new camera positions. For example, if the controller uses the rotate left button in the graphics display controls 176, the graphic image on the controller graphics display 174 may be rotated to the left by some selected amount to a new camera position. The rotation may be smoothly animated or it may be immediately displayed with no animation. A Camera Position Update message is transmitted to reflect the new camera position. The Camera Position Update message may include an indication as to whether the transition from the previous camera position to the new camera position should be animated or not when the manipulation is displayed on the viewer's graphic display 194.

Method 1300 then ends. Method 1300 is performed each time a Camera Position Update message is received by the system server 102 from the controller's computer.

Since method step 1204 in method 1200 is performed at the end of any manipulation of the 3D image by the controller, when the manipulation is completed, the images on the controller's and viewer's graphics displays 174 and 194 will be synchronized (unless the controller has begun another manipulation). If the controller performs a manipulation that lasts longer than the update period, the viewer's graphics display is updated periodically, allowing the controller's and viewer's graphics displays 174 and 194 to stay generally synchronized. A skilled person will understand that the length of the update period and communication delays will introduce some latency between the controller manipulating the 3D product image on his own graphics display and a corresponding manipulation being displayed on the viewer's graphics display. If a shorter update period is selected, the display of the 3D image on the controlling and the viewing computers will be more synchronized. If a longer update period is selected, the display will be less synchronized, but fewer Camera Position Update messages will be transmitted from the controlling computer to the viewing computer (although this may not be problematic since the Camera Position Update message are short, lightweight messages). In any case, when the controller has finished a manipulation, a Camera Position Update message is transmitted and the two displays are synchronized.

While methods 1200 and 1300 are being performed, the consumer and attendant may continuously use the text or voice (or both) interactive communication links established between their respective computers. The consumer may request information and the attendant may provide the requested information. The consumer and the attendant may manipulate the 3D image of the product to highlight and identify specific components and aspects of the product.

The Camera Position Update message is one type of Update Message that may be transmitted from the controlling computer to the system server 102 and then relayed from the system server 102 to the viewing computer.

The nature of Update Messages transmitted from the controlling computer to the server, and from the server to the viewing computer will depend on the nature of the object that is being manipulated. As described above, a Camera Position Update message relating to the manipulation of a 3D image may define the manipulation in polar, Cartesian or other coordinates. If a 2D image is displayed in the controller's display window 170, a Camera Position Update message describing a manipulation of the image may set out an x dimension translation a y dimension translation from the original position of the image when it was loaded, together with a zoom level for the image. The zoom levels for the x and y dimension may be differently controllable and the Camera Update Message can describe the different zoom levels separately.

Referring to FIG. 4, a pointer 186 on the consumer's display window 170 and a corresponding pointer 206 is displayed on the attendant's display window 190. The controller may move the pointer by moving a mouse 136 coupled to the controlling computer. When the pointer is moved, a Pointer Position Update message, which is another type of Update Message, is transmitted from the controlling computer to the system server 102. The Pointer Position Update message is relayed by the system server 102 to the viewing computer. As the controller moves the pointer, the position of the pointer may be transmitted periodically in a series of Pointer Position Update messages in a manner analogous to the transmission of a series of Camera Position Update messages, as described above in relation to method 1200. On the viewing computer, the position of the 102 is updated to correspond to the new position of the pointer on the controlling computer. The movement of the pointer may be animated, as described above in relation to the 3D image.

The playing of pre-recorded information is also synchronized on the controlling and viewing computers. If the controller initiates the play of any pre-recorded information, a Play Pre-Recorded Information message (which another type of Update Message) is transmitted from the controlling computer to the system server 102 and then relayed from the system server 102 to the viewing computer. The same prerecorded information is then played on the viewing computer. In some embodiments of the present invention, the pre-recorded information controls 184 may include controls to allow the pre-recorded information to be paused, reversed or played in a fast forward mode. If the controller uses such controls to manipulate the playing of the pre-recorded information, a Play Pre-Recorded Information message is transmitted from the controlling computer to indicate the manipulation. A Play Pre-Recorded Information may include information such as the playback rate (for example, reverse half speed or forward double speed) or a video frame number or a time point in a clip or audio block number at which the playback of the pre-recorded information has been paused. The client software on the viewing computer is responsive to the Play Pre-Recorded Information messages to initiate and manipulate the playing of pre-recorded information so that the playing of the pre-recorded information on the controlling and viewing computers is generally synchronized. The Play Pre-Recorded Information message is a lightweight message compared to typical pre-recorded video, audio or text information. Depending on the nature of the pre-recorded information, a Play Pre-Recorded Information message may include other synchronization information. For example, a frame rate or data rate may be specified to ensure that the playback of the pre-recorded information proceeds at generally the same rate on both the controlling and viewing computers. This is not necessary for information that is played at a pre-determined rate regardless of the processor speed or other characteristics of the controlling or viewing computers. For example, this type of control will typically not be required for a video clip that has a standard playback rate. The playing of the pre-recorded information on the controlling and viewing computers is thus controlled and synchronized efficiently, without requiring any audio, video or text data comprising the pre-recorded information to be exchanged between the controlling and viewing computers while the pre-recorded information is played.

Video information may be played in the graphics display 174 or 194. While the pre-recorded information is played, the controller may manipulate the pointer 186 or 206 to direct the viewer's attention to specific aspects of the displayed information. The pointer will also be generally synchronized in the display windows on the controlling and viewing computers. At the same time, the controller and the viewer may engage in an interactive voice or text communication or both.

System 100 provides a multi-media environment in which an attendant is able to more effectively provide information to a supplier's customers compared to current voice-only or text-only help desk assistance provided by many product suppliers. System 100 allows the attendant to provide customized information to the consumer in real-time, rather than limiting a consumer to previously recorded information available on a website.

Referring to FIG. 1, in system 100, the system server 102 transmits product data to both a consumer computer 104 and to an attendant computer 106. The product data is used during the Interactive Information Session. In another embodiment, the consumer or the attendant may add additional product data for a product during an Interactive Information Session. For example, display window 170 may include an "Upload Product Data" button. The consumer can click the button to initiate to open a dialog box allowing the consumer to identify a new piece of product data, which is then uploaded to the server 102. The server 102 then transmits the product data to the attendant computer 104. The controller of the session may then display the new product data in the controller's display window. This triggers an Update Message that results in the new product data also being displayed in the viewer's display window. The controller may then manipulate the new product data, or may discuss it with the viewer using the voice chat or text chat communication link between the two computers.

For example, a consumer may take a digital picture of a product as the consumer has assembled it. The consumer may upload the picture to the system server, which then transmits the picture to the attendant computer. The controller of the session may then display the picture in the graphics window of the controller's display window. Both the controller and the viewer will see the picture and they may discuss it. The controller may also manipulate the picture in the same way as any other picture in the product data.

Figure 7:
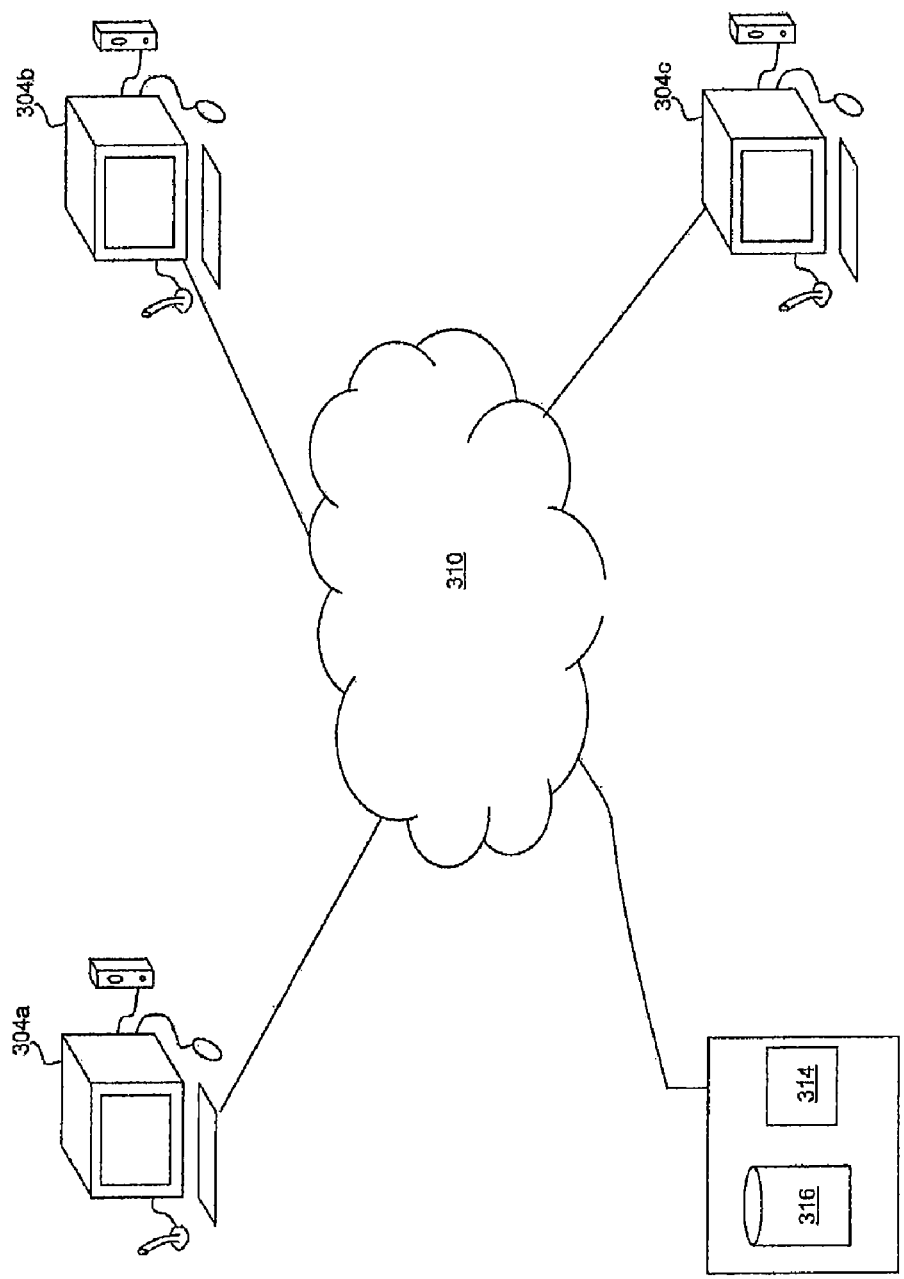
FIG. 7 illustrates a system according to a second embodiment of the invention.

Reference is next made to FIG. 7, which illustrates a system 300 according to a second embodiment of the present invention. System 300 may be used for interactive product design by two or more users. System 300 includes a system server 302 and two or more user computers 304.

The system server 302 includes a server communication module 314 and a product database 316, which is used to record product data. The system server 302 manages the creation and operation of an interactive and collaborative product design session.

Each user computer includes one or more input devices 132 and one or more output devices 140. Each user computer 304 is used to execute user client software 350 that comprises a user media module 352 and a user communication module 354. The structure and operation of the user media module 352 corresponds to that of the consumer media module 152 described above in relation to system 100. Similarly, the structure and operation of user communication module 354 corresponds to that of the consumer communication module 154 described above. During a product design session, two or more users operate user computers 304 to view and modify a product that is under design.

Users join a product design session by logging into a product design website operated by the system server 302 or another computer system. Once a user has logged in, the user may join a product design session. Typically, a user will be invited to join the product design session by the product supplier at an appointed time. When the user logs in, the sessions to which the user has been invited may be listed and the user can select one of them. If the user has been invited to join only one session when he logs in, the user may be immediately joined to the product design session.

In another embodiment, a user's invitation to join a session may include a link directly to the session. For example, the user may receive an e-mail containing a URL (which may be in the form of an http link) for a particular session. When the user accesses the URL, the user is presented with a login page and after successfully logging in, the user is taken directly to the session, without having to identify the session specifically. In some embodiments, a user may be invited to join an ongoing session and may be sent an e-mail message with an embedded URL to the session by one of the participants in the session.

Returning to a description of system 300, when a user joins a product design session, a display window 370 is opened on the user's computer 304. This is done in a manner analogous to that described above in relation to system 100 and display windows 170 and 190. The system server 302 maintains a record of each user that is part of a product design session. The system server 302 instructs the communication module 354 operating on each user computer 304 to join an interactive communications connection, which may be a voice chat connection or a text chat connection. In some embodiments of the invention, both voice chat and text chat connections may be established.

Figure 8:
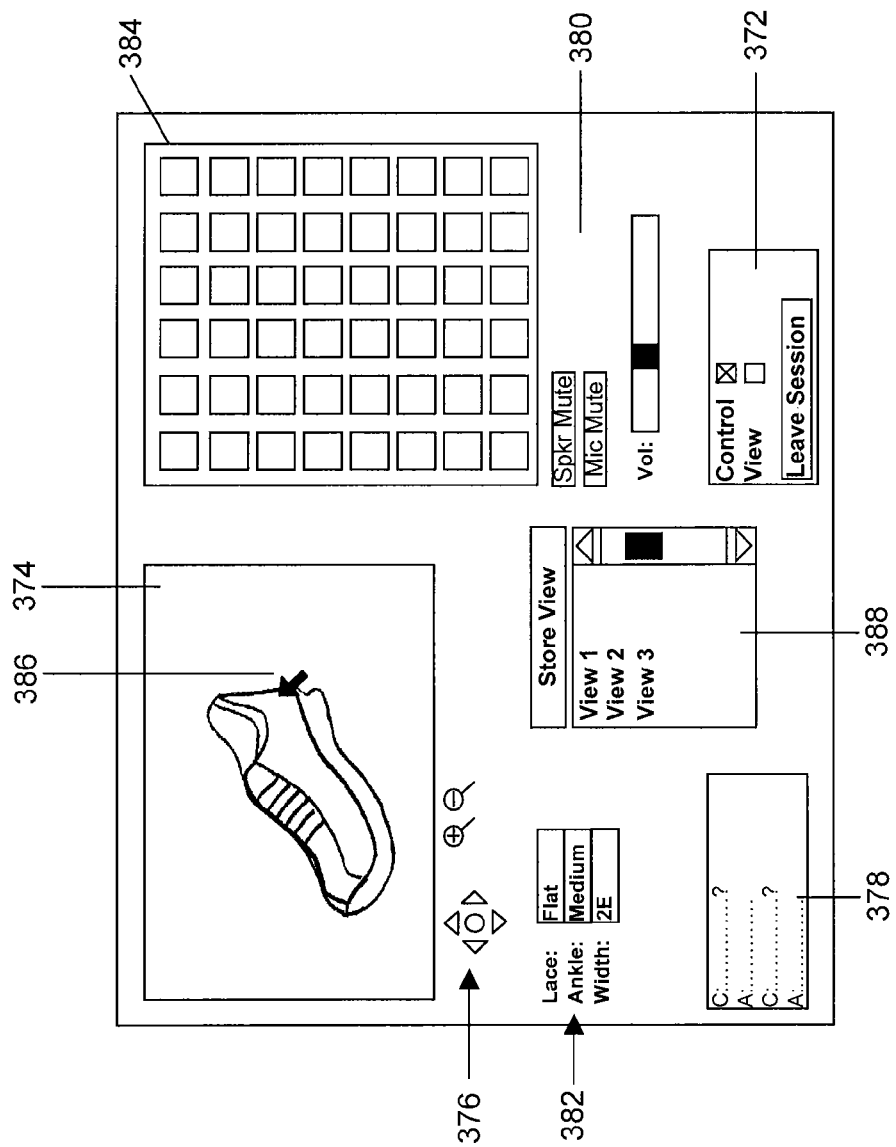
FIG. 8 illustrates a user display window during an exemplary use of the system of FIG. 7.

Reference is made to FIG. 8, which illustrates a typical display window 370 on a user computer 304 when system 300 is in use. The display window 370 includes session controls 372, a graphics display 374, graphics display controls 376, a text chat display 378, voice chat controls 380, product option controls 382 and product design controls 384 and view controls 388.

The session controls 372 include "Control" and "View" radio buttons and "Leave Session" button. As described above in relation to the system 100, one of the participants in an Interactive Information Session can be in control of the 3D image displayed in the graphics display 374 and other aspects of the session at one time. In system 100, the attendant decides whether the consumer or the attendant is in control at any time. In system 300, two or more users may collaborate in a product design session. Any one of the users may take control of the product design session by clicking on the Control radio button. When a user does so, the user communication module 354 in the user's client software 350 transmits a "Taking Control" message to the system server 302. That user then becomes the controller of the product design session. The system server 302 then transmits a "Release Control" message to the user communication module 354 operating on the user computer that previously had control of the product design session. Each of those users becomes (or remains) a viewer. The user that has taken control may then modify the design of the product and may manipulate the view of the product in the graphics display 374.

In the display window 370, an example product, a shoe, is shown. Typically, a product supplier will define one or more parts or aspects of the product that can be modified by the user in a product design session. In the present example, the supplier has defined the tongue, laces and several panels of shoe's uppers and the sole of the shoe as parts that can be modified independently of one another.

In this example, the product design controls 384 are a group of buttons indicating different colors that could be used for different parts of the shoe. The user in control of the product design session may select one of the parts by moving the pointer 386 on to the part and clicking a mouse button. The user may then select a color for the part by selecting one of the product design controls. When a user does so, the user's communication module 354 sends a Change Design message to the system server 302, detailing the change that has been made. The Change Design message is a type of Update Message. The system server then sends a Change Design message to the other user's computers 304 and the communication module 354 and media module 352 on the other user's computers 304 update the display of the product to correspond to the design change.

In the present embodiment, the supplier has also permitted some physical design changes to be made to the displayed shoe. In particular, the user in control of the product design session may choose different lace types (flat or round), different ankle heights (Low, Medium or High) and different widths for the shoe (A, B, D, E, 2E or 3E). When the user changes one of these aspects of the shoe, the display is modified to illustrate the change and a Change Design message is similarly sent to the system server 302 and propagated to the other user computers 304.

When the user in control of the session manipulates the display of the product by changing the camera position, the manipulation is also reported to the system server 302 in a Camera Position Update message and propagated to the other user computers 304 in a manner analogous to that described above in relation to methods 1200 and 1300. In system 300, all user computers 304 that are in the view mode receive a Camera Position Update message or a Change Design message whenever such a message is sent from the controlling computer 304. This ensures that all of the users participating in the product design session see the product as its design evolves.

In the present embodiment, the system server keeps a record of each Update Message, including each Camera Position Update or Change Design message, that is sent to it. If a user joins a product design session after it has already begun, the server can update the additional user's display window 370 by transmitting some or all of the Change Design messages and at least the most recent Camera Position Update message. Similarly, if a user becomes disconnected and must re-join a product design session, the user's display window 370 can be updated.

Simultaneously with viewing the product in its current position and design, the users participating in a product design session may use their voice chat connection or text chat connection to discuss and collaborate on the design. In the present embodiment, all users participating in a product design session can hear the voice of all other users or read text entered by all other users. In another embodiment of the invention, a user may be allowed to select whether they wish to hear the voice or read the text messages of other specific users. Users may also be permitted to control which other users can hear their own voice or see their text messages.

View controls 388 are used to store views of the product and to display previously stored views. The user in control of a product design session may click on the Store View button. The user's communications module 354 sends a Store Current View message to the system server 302, which stores the current view of the based on the Camera Position Update messages and Change Design messages that it has received. The system server 302 also selects a name for the view and transmits a New View message to each of the user computers 304 participating in the product design session, including the user computer 304 that sent the Store Current View message. The New View message includes the current camera position and the current design of the product at the time of the view. The new view is not displayed in the display window 370, but the name of the view is added to the list of stored views in the views controls 388. Subsequently, the user in control of a session can select one of these views to be displayed. A Display Stored View message is sent to the system server and propagated to all of the other user computers 304 and the stored view is displayed in the display window 370 on all of the user computers 304. The users may thus store different views and quickly switch to the different views to compare different designs of the product. Since each view is stored by reference to a camera position, the controlling user may then manipulate the 3D image beginning from the position of the view once it is displayed.

View controls 388 may be provided in another embodiment of system 100 to provide view storing and retrieval functionality in that embodiment.

In another embodiments of the present invention, the controller of a product design session may be able to add graphic or text annotations (or both) to the image displayed in the display window 370. For example, such annotations may be two-dimensional images overlaid on the 3D image in the graphics display 374. When such annotations or graphics are added to an image, an Update Message is used to cause annotation or graphic to be displayed on the user computers participating in a product design session. When a view is stored, the annotation is stored as part of the view and when the view is subsequently displayed, the annotation is also displayed.

In another embodiment of system 300, the product data may also include pre-recorded information and such information may be displayed on all of the user's display windows, under the control of the controlling user, as described above in relation to system 100 through the use of different Update Messages.

As noted above, the system server 302 records all Update Messages, including all Camera Position Update and Change Design messages sent to it. The system server 302 also records all views that are stored during a session. This information may be retained after a product design session ends to allow the session to be continued or to allow the different designs considered during a session to be reviewed subsequently. The recorded information may also be used to re-create the session and in effect serve as a recording of the session. Voice and text chat data may also be stored and may be replayed to recreate the product design session in whole or in part. A previously recorded session may be replayed as part of a subsequent product design session and two or more users may continue to collaborate on the design of a product, effectively continuing the previously recorded session.

The users may add additional product information during a product design session by uploading additional product data to the server 302, as was described above. The new product data is distributed to all of the user computer's participating in the product design session and the controller may display or otherwise use the new product data.

System 300 may also be used for interactive product demonstrations in which one of the users demonstrates a product to one or more other users. The user conducting the demonstration may maintain control over the session and may manipulate a 3D image, 2D image or use pre-recorded information to provide information to the other users, while the user participate in an interactive voice or text chat.

The present invention has been described here by way of example only. The features of the various embodiments may be combined to form additional embodiments of the invention. In addition, various modification and variations may be made to these exemplary embodiments without departing from the spirit and scope of the invention, which is limited only by the appended claims.

I claim:

1. A method for an interactive session comprising:
   storing a data object in a database;
   transmitting the data object to one or more computers, wherein at least a portion of the data object is displayed on the one or more computers by client software; and
   synchronizing display of at least the portion of the data object on the one or more computers, wherein synchronizing comprises:
   generating an update message that describes a modification of the display of at least the portion of the data object, wherein the update message includes a camera position of the data object; and
   transmitting the update message to the one or more computers such that the display of at least the portion of the data object can be updated at the one or more computers based on the update message.

2. The method of claim 1, wherein the data object includes initial display instructions for defining how the data object is displayed when initially displayed on the one or more computers.

3. The method of claim 1, wherein the update message is generated and transmitted by a controlling computer, and wherein the one or more computers are designated as viewing computers.

4. The method of claim 3, further comprising receiving a request from a computer to designate the computer as the controlling computer, and responsive to receiving the request, designating a prior controlling computer as a viewing computer.

5. The method of claim 1, wherein the update message is transmitted from a system server to the one or more computers.

6. The method of claim 3, wherein the camera position describes a current camera position of the data object on the controlling computer, and wherein the viewing computers are configured to change the display of the data object on the viewing computers to correspond to the current camera position of the data object on the controlling computer.

7. The method of claim 3, wherein the data object includes pre-recorded information, and wherein the update message includes an instruction to play the pre-recorded information.

8. The method of claim 3, wherein the data object includes information relating to alternative configurations of a product, and wherein the update message includes an instruction to display an alternative configuration of the product.

9. The method of claim 3, wherein the data object comprises an animation, and wherein synchronizing comprises synchronizing the display of the animation on the one or more computers.

10. The method of claim 1, further comprising receiving a store current view message from one of the one or more computers and, responsive to the store current view message, recording view data related to a current display of the data object.

11. The method of claim 10, further comprising transmitting a new view message to each of the one or more computers from which the store current view message was not received, wherein the new view message includes the view data and an identifier for the view data.

12. The method of claim 11, further comprising:
   receiving a display stored view message from a controlling computer, wherein the display stored view message includes the identifier for the view data; and
   transmitting a corresponding display stored view message to the one or more computers.

13. The method of claim 1, further comprising establishing an interactive communication link between the one or more computers to facilitate interactive communication between the one or more computers, wherein the interactive communication link is an audio communication link.

14. The method of claim 1, further comprising establishing an interactive communication link between the one or more computers to facilitate interactive communication between the one or more computers, wherein the interactive communication link is a text communication link.

15. The method of claim 1, wherein the database is stored in a system server and wherein the data object is transmitted from the system server to the one or more computers.

16. The method of claim 1, further comprising receiving an initiate interactive information session message, wherein the data object is transmitted to the one or more computers in response to the initiate interactive information session message.

17. The method of claim 1, wherein the data object comprises product data relating to a product and an image of the product.

18. The method of claim 1, wherein the data object comprises at least one image of a planogram, a floor plan, a photograph, a drawing, an architectural plan, or a model.

19. The method of claim 1, further comprising:
receiving additional data from one of the one or more computers;
storing the additional data in the database; and
transmitting the additional data to any of the one or more computers from which the additional data was not received, wherein the additional data is displayed on each of the one or more computers.

20. The method of claim 1, further comprising transmitting a link to join the interactive session to the one or more computers.

21. The method of claim 1, wherein the update message includes an annotation of the data object on a controlling computer, and wherein the one or more computers are configured to display the annotation of the data object.

22. The method of claim 6, wherein the current camera position is defined using polar coordinates and an orbit distance, and wherein the polar coordinates are relative to a horizontal reference plane and a vertical reference plane defined with respect to the data object.

23. The method of claim 6, wherein the current camera position is defined using Cartesian coordinates relative to a reference position defined with respect to the data object.

24. The method of claim 1, wherein the data object comprises at least one of an image of a planogram, an image of a floor plan, a consumer product, a moving image, a video, an animation, a photograph, a model, an architectural plan, textual information, an audio file, a color scheme, and a layout option.

25. A server apparatus comprising:
a database configured to store a data object; and
a processor operatively coupled to the database and configured to:
transmit the data object to one or more computers, wherein at least a portion of the data object is displayed on the one or more computers by client software;
generate an update message that describes a modification of a display of at least the portion of the data object, wherein the update message includes a camera position of the data object; and
transmit the update message to the one or more computers such that the display of at least the portion of the data object can be updated at the one or more computers based on the update message.

26. The server apparatus of claim 25, wherein the update message includes an annotation of the data object on a controlling computer, and wherein the one or more computers are configured to display the annotation of the data object.

27. The server apparatus of claim 25, wherein the data object comprises an animation, and wherein the update message is used by the one or more computers to synchronize a display of the animation on the one or more computers.

* * * * *

UNITED STATES PATENT AND TRADEMARK OFFICE
CERTIFICATE OF CORRECTION

| | |
|---|---|
| PATENT NO. | : 8,311,894 B2 |
| APPLICATION NO. | : 12/706486 |
| DATED | : November 13, 2012 |
| INVENTOR(S) | : Nykamp |

It is certified that error appears in the above-identified patent and that said Letters Patent is hereby corrected as shown below:

On the Title Page, in Item (56), under "OTHER PUBLICATIONS", in Column 2, Line 5, delete "&sId=" and insert -- &sid= --, therefor.

On Title Page 3, in Item (56), under "OTHER PUBLICATIONS", in Column 2, Line 15, delete ""Enchanced" and insert -- "Enhanced --, therefor.

In the Specifications:

In Column 7, Lines 27-30, delete "Interactive Information Service message ............. following information:" and insert the same at Line 26 after "Initiate", as a continuation of the paragraph.

In Column 16, Line 1, delete "computer 104." and insert -- computer 106. --, therefor.

In Column 18, Lines 36-57, delete "View message to the system server 302, ............. view once it is displayed." and insert the same at Line 35 after "Current", as a continuation of the paragraph.

In Column 19, Line 43, delete "modification" and insert -- modifications --, therefor.

Signed and Sealed this
Twenty-eighth Day of May, 2013

Teresa Stanek Rea
*Acting Director of the United States Patent and Trademark Office*